(12) United States Patent
Tao et al.

(10) Patent No.: US 12,480,953 B2
(45) Date of Patent: Nov. 25, 2025

(54) SINGLE MOLECULE IMAGING

(71) Applicant: ARIZONA BOARD OF REGENTS ON BEHALF OF ARIZONA STATE UNIVERSITY, Scottsdale, AZ (US)

(72) Inventors: Nongjian Tao, Scottsdale, AZ (US); Shaopeng Wang, Chandler, AZ (US); Pengfei Zhang, Scottsdale, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 720 days.

(21) Appl. No.: 17/799,230

(22) PCT Filed: Feb. 12, 2021

(86) PCT No.: PCT/US2021/017982
§ 371 (c)(1),
(2) Date: Aug. 11, 2022

(87) PCT Pub. No.: WO2021/163581
PCT Pub. Date: Aug. 19, 2021

(65) Prior Publication Data
US 2023/0112565 A1    Apr. 13, 2023

Related U.S. Application Data

(60) Provisional application No. 63/137,611, filed on Jan. 14, 2021, provisional application No. 62/975,473, filed on Feb. 12, 2020.

(51) Int. Cl.
*G01N 33/68*    (2006.01)
*B01L 3/00*    (2006.01)
(Continued)

(52) U.S. Cl.
CPC .... *G01N 33/6803* (2013.01); *B01L 3/502761* (2013.01); *G01N 15/1434* (2013.01);
(Continued)

(58) Field of Classification Search
CPC .......... G01N 33/6803; G01N 15/1434; G01N 33/54386; G01N 21/51; G01N 21/553;
(Continued)

(56) References Cited

U.S. PATENT DOCUMENTS 5,832,165 A    11/1998  Reichert et al.
6,249,341 B1 *  6/2001  Basiji ................... G01N 15/147
                                               356/73

(Continued)

FOREIGN PATENT DOCUMENTS

WO    2019211631 A1    11/2019

OTHER PUBLICATIONS

International Search Report and Written Opinion mailed Apr. 26, 2021 in corresponding International Application No. PCT/US2021/017982, 10 pages.

*Primary Examiner* — Brian J. Sines
(74) *Attorney, Agent, or Firm* — MH2 Technology Law Group, LLP

(57) ABSTRACT

Detecting single molecules includes binding the single molecules to a surface of an optically transparent substrate, irradiating the surface of the substrate with light having an incident angle selected to achieve total reflection of the light, thereby scattering light from the surface and from the single molecules bound to the surface, and collecting light scatted by the surface and by the single molecules bound to the surface to form a series of images. Systems for detecting single molecules include an optically transparent substrate, a means for flowing a sample solution over a surface of the substrate, a light source configured to irradiate the surface,
(Continued)

a camera, and a collection optical system configured to collect light scatted by the surface and by the target molecules on the surface to form a series of images on the camera.

49 Claims, 9 Drawing Sheets

(51) Int. Cl.
*G01N 15/1434* (2024.01)
*G01N 33/543* (2006.01)

(52) U.S. Cl.
CPC ............ *G01N 33/54386* (2013.01); *B01L 2200/0652* (2013.01); *B01L 2300/0654* (2013.01); *B01L 2300/12* (2013.01)

(58) Field of Classification Search
CPC ......... G01N 33/54373; B01L 3/502761; B01L 2200/0652; B01L 2300/0654; B01L 2300/12
See application file for complete search history.

(56) References Cited

U.S. PATENT DOCUMENTS

| | | | |
|---|---|---|---|
| 7,271,896 B2* | 9/2007 | Chan | G01N 21/65 436/164 |
| 7,843,562 B2 | 11/2010 | Chan et al. | |
| 2007/0281315 A1* | 12/2007 | Takahashi | G01N 21/6452 435/6.12 |
| 2012/0126142 A1 | 5/2012 | Matsui et al. | |
| 2014/0045209 A1 | 2/2014 | Chou et al. | |
| 2019/0002973 A1 | 1/2019 | Previte et al. | |

\* cited by examiner

SINGLE MOLECULE IMAGING

CROSS-REFERENCE TO RELATED APPLICATIONS

This application is a national stage entry under 35 U.S.C. § 371 of PCT Application No. PCT/US2021/017982 entitled "SINGLE MOLECULE IMAGING" filed Feb. 12, 2021, which claims the benefit of U.S. Provisional Application No. 62/975,473 filed on Feb. 12, 2020, and U.S. Provisional Application No. 63/137,611 filed Jan. 14, 2021, the disclosures of which are hereby incorporated by reference in their entireties.

STATEMENT OF GOVERNMENT INTEREST

This invention was made with government support under R01 GM107165 awarded by the National Institutes of Health. The government has certain rights in the invention.

TECHNICAL FIELD

This invention relates to devices, systems, and methods for single molecule imaging and analysis based on scattering of an evanescent field near a sensor surface created by surface plasmon resonance (SPR) or total internal reflection (TIF).

BACKGROUND

Label-free optical detection technologies typically fall into two categories: far field (the light field can propagate in space over multiple times the light wavelength) and near field (the light field cannot propagate in space and is localized within a range of the light wavelength). While near field methods such as surface plasmon resonance (SPR) microscopy have been used to achieve high spatial resolution, imaging of single molecules has been elusive. Traditional SPR or total internal reflection (TIF) detects reflected light, which produces a strong background that overwhelms the weak signal from single molecules. In addition, it generates a diffraction pattern of several microns in size, which lowers the image spatial resolution.

SUMMARY

Near field systems and methods described herein have various advantages over their far field counterparts. First, the evanescent field (near field) intensity is localized near the sensor surface, making it surface sensitive, which reduces interference from molecules in the bulk solution. Second, there is large enhancement (20-30 times) in the field near the sensor surface, which contributes to the high sensitivity (e.g., of SPR and TIF). In addition, resonance conditions of SPR and TIF depend on the refractive index near the sensor surface, such that binding of small molecules or ions that do not scatter much light can also be measured with the same setup.

In addition, methods described herein can be used to assess molecular binding kinetics by a digital counting approach that obviates the need to measure the shift in the surface plasmon resonance angle and provides a precise measurement of binding kinetics. The digital counting approach disclosed here can be used to determine the number of molecules that bind to the sensor surface and the size of the molecules simultaneously.

Light scattered from an isolated object (e.g., a molecule) drops quickly with the size of the object. Here, a sensor with an appropriate level of surface roughness is used to produce scattered light that interferes with light scattered from the object, producing an image contrast that drops less quickly than that from the isolated object.

Shot noise is a fundamental limit in the optical imaging. To minimize shot noise, one strategy is to increase the incident light intensity, which can cause the heating of the molecules on the sensor surface. As described herein, a cooling mechanism is implemented in the fluidics to remove heating by regulating the sample flow.

This disclosure also describes plasmonic scattering microscopy (PSM), a prism-based SPR system for detection of single unlabeled proteins via plasmonic scattering imaging, allowing measurement of single protein mass and investigation of molecular binding processes at the single-molecule level. Comparing to ensemble SPR, single molecule based measurements can distinguish specific and non-specific binding processes by quantifying the mass and binding dynamics of individual bound analyte molecules. In addition, the prism based SPR is low in cost and mechanically stable.

As described herein, plasmonic scattering imaging technology can overcome physical constraints of the prism configuration that limit the numerical aperture and magnification for label-free single molecule imaging applications. The imaging setup and detection principle are described, and the detection principle is verified by performing a calibration with nanoparticles of different sizes and proteins with different molecular mass. Single protein imaging is shown to reveal specific and nonspecific binding processes at a detailed level. In addition, systems and methods described herein can differentiate individual bound proteins with different molecular weights, and also reveal different binding behaviors of specific and nonspecific binding. This approach allows the label free binding kinetic analysis in complex media such as serum. In addition, the rigid mechanical structure of prism configuration of the prism coupled PSM facilitates measurement reproducibility, improves system stability, and simplifies instrument operation.

PSM utilizes the large plasmonic enhancement as the traditional SPR technology, thus allowing a high signal to noise ratio with either lower incident light power or wider field of view compared with nonplasmonic methods. PSM also avoids collection of the reflected light, thus providing at least three benefits over traditional SPR imaging: 1) provides a darker background that improves the contrast; 2) allows to use high incident light intensity to improve the signal to noise ratio; and 3) eliminates the parabolic tails in SPRM image and improves the spatial resolution. Furthermore, the PSM scheme employs an objective placed on top of the sample to image the surface plasmonic waves scattered by the analytes instead of the total internal reflection fluorescence (TIRF) objective in SPRM to create the reflection images. This makes it possible to construct a single molecule imaging system with the prism configuration instead of the TIRF objective for more stable SPR excitation, because a prism configuration does not need to accurately control the distance between a suspended cover glass and a TIRF objective filled with immersion oil, and therefore it is not affected by the oil drift, which is susceptible to environmental noise and has large effect on both incident light conditions and focus of images, one common issue in SPRM. The prism based PSM provides single protein imaging capability for understanding the biological processes at detailed level, and good measurement reproducibility, owing at least in part to the rigid mechanical structure of the prism configuration.

Although the disclosed inventive concepts include those defined in the attached claims, it should be understood that the inventive concepts can also be defined in accordance with the following embodiments.

In addition to the embodiments of the attached claims and the embodiments described above, the following numbered embodiments are also innovative.

Embodiment 1 is a method of detecting single molecules, the method comprising: binding the single molecules to a surface of an optically transparent substrate; irradiating the surface of the substrate with light having an incident angle selected to achieve total reflection of the light, thereby scattering light from the surface and from the single molecules bound to the surface; and collecting light scatted by the surface and by the single molecules bound to the surface to form a series of images.

Embodiment 2 is the method of embodiment 1, wherein a roughness of the surface is selected such that the surface produces scattered light for sufficient interference with the light scattered by the single molecules.

Embodiment 3 is the method of the embodiment of 2, wherein the roughness of the surface is between 1 nm and 100 nm.

Embodiment 4 is the method of any one of embodiments 1 through 3, further comprising processing the series of images.

Embodiment 5 is the method of embodiment 4, wherein processing the series of images comprises: averaging images in the series of images; subtracting a previous image from each image to form a differential image sequence; and integrating the differential image sequence over time.

Embodiment 6 is the method of any one of embodiments 1 through 5, further comprising counting a number of single molecules bound to the surface over time and fitting with a binding model to determine kinetic constants and affinity.

Embodiment 7 is the method of any one of embodiments 1 through 6, further comprising correcting for mechanical drift.

Embodiment 8 is the method of embodiment 7, wherein correcting for mechanical drift comprises: identifying one or more features of the surface; determining a drift displacement for each image; and subtracting the drift displacement from each image.

Embodiment 9 is the method of any one of embodiments 1 through 8, wherein the optically transparent substrate is coated with capture molecules, such that the specific binding of a target analyte in a sample solution can be detected and identified.

Embodiment 10 is the method of any one of embodiments 1 through 9, wherein the surface is coated with a metallic layer, and the incident angle is selected to create surface plasmon resonance on the metallic layer.

Embodiment 11 is the method embodiment 10, wherein the metallic layer is gold.

Embodiment 12 is the method of any one of embodiments 1 through 11, wherein the optically transparent substrate comprises an optical objective attached to a glass slide with index matching oil.

Embodiment 13 is the method of any one of embodiments 1 through 12, wherein the optically transparent substrate comprises an optical prism attached to a glass slide with index matching oil.

Embodiment 14 is a system comprising: an optically transparent solid substrate; a means for flowing a sample solution over a surface of the substrate; a light source configured to irradiate the surface with light having an incident angle selected to achieve total reflection of the light; a camera; and a collection optical system configured to collect light scatted by the surface and by the target molecules on the surface while avoiding collection of light reflected from the surface to form a series of images on the camera.

Embodiment 15 is the system of embodiment 14, wherein a roughness of the surface is selected such that the surface produces scattered light for sufficient interference with the light scattered by the target molecules.

Embodiment 16 is the system of embodiment 15, wherein the roughness of the surface is between 1 nm and 100 nm.

Embodiment 17 is the system of any one of embodiments 14 through 16, wherein the means for flowing a sample solution over the surface of the substrate comprises: a fluidic chamber with an inlet and an outlet on the surface of the substrate; a means to deliver sample and reference solutions over the surface of the substrate; and a means to adjust the sample and reference solution flow velocity to minimize heating of the surface associated with incident light.

Embodiment 18 is the system of any one of embodiments 14 through 17, further comprising a controller, wherein the controller is configured to: average images in the series of images; subtract a previous image from each image to form a differential image sequence; and integrate the differential image sequence over time.

Embodiment 19 is the system of any one of embodiments 14 through 18, wherein the collection optical system is configured to collect light scatted by the surface and by the target molecules on the surface from the opposite side of the incident and reflected light.

Embodiment 20 is the system of any one of embodiments 14 through 19, wherein the collection optical system is configured to collect light scatted by the surface and by the target molecules on the surface on the same side of the incident and reflected light, but avoid the collection of the reflected light.

Embodiment 21 is the system of any one of embodiments 14 through 20, wherein the surface comprises receptors configured to bind to the target molecules, and binding and unbinding of the target molecules is detected by counting the target molecules over time and fitting with a binding model to determine kinetic constants and affinity.

Embodiment 22 is the system of any one of embodiments 14 through 21, further comprising a controller, wherein the controller is configured to correct for mechanical drift.

Embodiment 23 is the system of embodiment 22, wherein correcting for mechanical drift comprises: identifying one or more features of the surface; determining a drift displacement for each image; and subtracting the drift displacement from each image.

Embodiment 24 is the system of any one of embodiments 14 through 23, wherein the solid substrate is coated with capture molecules, such that the specific binding of a target analyte in a sample solution can be detected and identified.

Embodiment 25 is the system of any one of embodiments 14 through 24, wherein the surface is coated with a metallic layer, and the incident angle is selected to create surface plasmon resonance on the metallic layer.

Embodiment 26 is the system of embodiment 25, wherein the metallic layer is gold.

Embodiment 27 is the system of any one of embodiments 14 through 26, wherein the optically transparent solid substrate comprises an optical objective attached to a glass slide with index matching oil.

Embodiment 28 is the system of any one of embodiments 14 through 27, wherein the optically transparent solid substrate comprises an optical prism attached to a glass slide with index matching oil.

Embodiment 29 is a method of imaging a multiplicity of components in a liquid sample, the method comprising: flowing the liquid sample over a metal-coated surface of an optically transparent substrate, thereby coupling the components to the metal-coated surface; directing light to the metal-coated surface through an optical prism at an incident angle selected to achieve surface plasmon resonance at the metal-coated surface; obtaining, over a length of time, a series of images comprising regions corresponding to light scattered by each component coupled to the metal-coated surface; and assessing, from the series of images, an intensity of the light scattered by each component coupled to the metal-coated surface as a function of time.

Embodiment 30 is the method of embodiment 29, wherein a peak intensity of the light scattered from each component increases with a mass of the component.

Embodiment 31 is the method of any one of embodiments 29 through 30, further comprising assessing, from the series of images, a length of time each component is coupled to the metal-coated surface.

Embodiment 32 is the method of embodiment 31, wherein the length of time each component is coupled to the metal-coated surface is indicative of the mechanism by which the component is coupled to the metal-coated surface.

Embodiment 33 is the method of any one of embodiments 29 through 32, wherein the multiplicity of components comprise a multiplicity of target molecules.

Embodiment 34 is the method of embodiment 33, wherein the metal-coated surface comprises receptors, and each receptor is configured to specifically bind to one of the multiplicity of target molecules.

Embodiment 35 is the method of embodiment 34, wherein the multiplicity of components comprises a multiplicity of non-target molecules.

Embodiment 36 is the method of embodiment 35, wherein the non-target molecules do not specifically bind to the receptors.

Embodiment 37 is the method of embodiment 36, further comprising distinguishing the target molecules from the non-target molecules based on a peak intensity of the light scattered by each component coupled to the metal-coated surface.

Embodiment 38 is the method of embodiment 36 or 37, further comprising distinguishing the target molecules from the non-target molecules based on a length of time each component is coupled to the metal-coated surface.

Embodiment 39 is the method of any one of embodiments 34 through 38, further comprising distinguishing target molecules bound to the receptors from target molecule otherwise coupled to the metal-coated surface based on a length of time each target molecule is coupled to the metal-coated surface.

Embodiment 40 is the method of any one of embodiments 34 through 39, further comprising assessing a number of target molecules that bind to the receptors during a preselected time interval.

Embodiment 41 is the method of embodiment 40, further comprising assessing a number of target molecules that unbind from the receptors during the preselected time interval.

Embodiment 42 is the method of embodiment 41, further comprising assessing an order of the binding kinetics between the target molecules and the receptors.

Embodiment 43 is the method of any one of embodiments 34 through 42, further comprising distinguishing a bound target molecule from a bound aggregate of target molecules based on a peak intensity of the light scattered by each component coupled to the metal-coated surface.

Embodiment 44 is the method of embodiment 43, further comprising a number of target molecules in the aggregate of target molecules based on the peak intensity of the light scattered by the aggregate of target molecules.

Embodiment 45 is the method of any one of embodiment 33 through embodiment 44, wherein the target molecule is a protein.

Embodiment 46 is the method of any one of embodiment 29 through embodiment 45, wherein the liquid sample comprises a buffer solution and at least 10 wt % serum.

Embodiment 47 is the method of embodiment 46, wherein flowing the liquid sample over the metal-coated surface comprises combining the liquid sample with a carrier liquid, and the carrier liquid comprises the buffer solution or a different buffer solution.

Embodiment 48 is the method of any one of embodiment 29 through embodiment 47, wherein the light scattered by each component coupled to the metal-coated surface corresponds to interference between surface plasmonic waves scattered by a roughness of the metal-coated surface and the target molecule.

Embodiment 49 is the method of any one of embodiment 29 through embodiment 48, wherein the metal-coated surface is a gold-coated surface, a silver-coated surface, or an aluminum-coated surface.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Figure 1A:
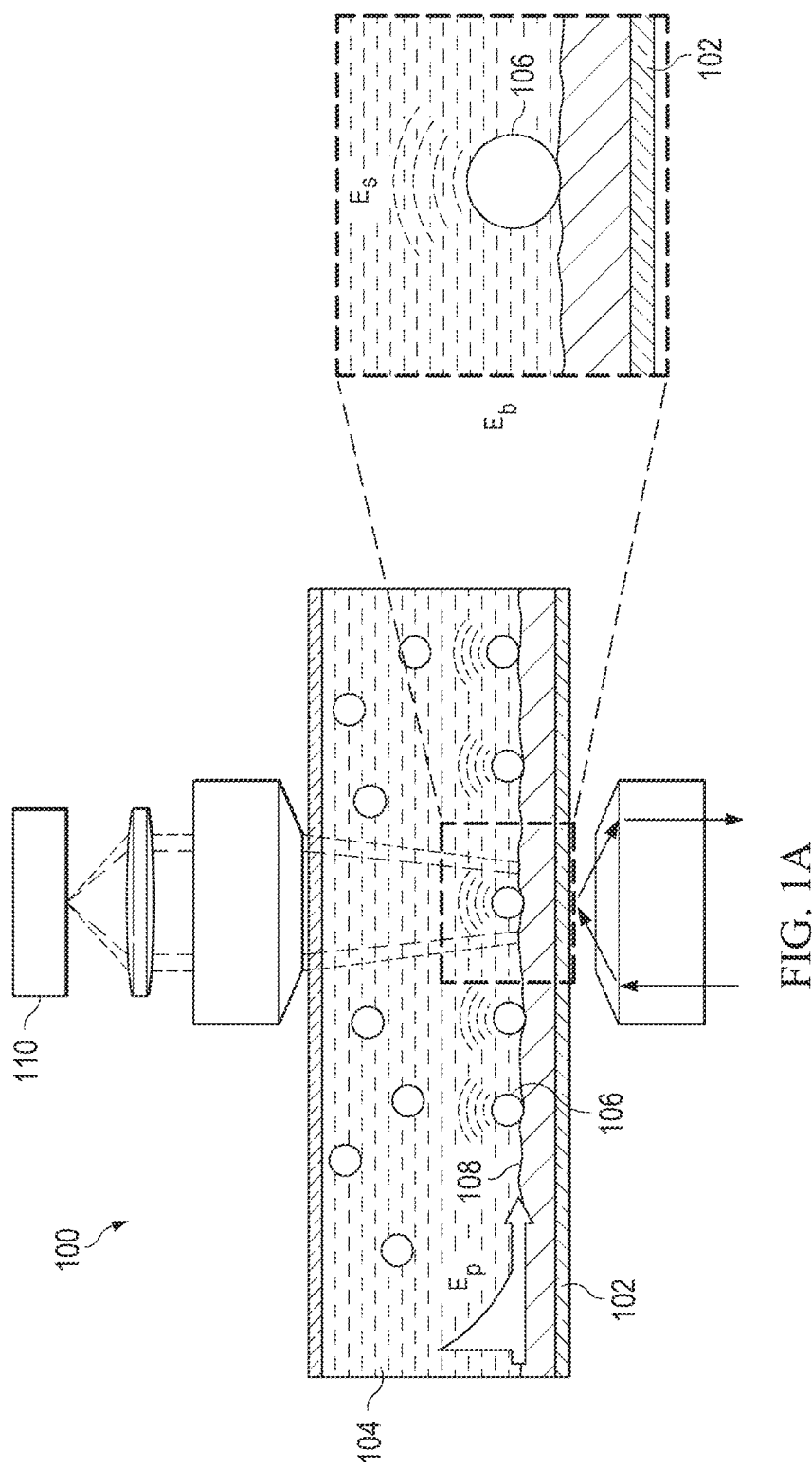
FIGS. 1A and 1B depict an objective-based plasmonic imaging system that can be used to detect single molecule binding to the surface of a sensor.

Systems and methods described herein include implementations of near field optical imaging in which the near field is created by surface plasmon resonance (SPR) or total internal reflection (TIF). Rather than detection of reflected light, however, scattered light from the sample molecules and sensor surface is detected. Light scattered by a molecule in free space scales with the $6^{th}$ power of the molecular diameter. For this reason, the scattered light intensity diminishes quickly with the molecular size, making it difficult to image single molecules. To overcome this issue, a sensor surface with a selected roughness is used, such that the sensor surface scatters light with a magnitude comparable with that of the scattered light from the target single molecules. There are different ways to define surface roughness, and one of which is given by $$\sqrt{\frac{1}{n}\sum_{i=1}^{n} y_i^2} \quad (1)$$

where $y_i$ is the height at position i, and n is the number of positions. Using this definition, the surface roughness of a gold surface is ~1.5 nm.

In some implementations, a roughness of the sensor surface is in a range of about 1 nm to about 100 nm. The interference of light scattered from the protein and sensor surface produces an image contrast that scales with the $3^{rd}$ power of the molecular diameter. This slows down the decay in image contrast with the molecular size, which favors imaging of small objects (e.g., single protein molecules).

Rough features and impurities on the sensor surface, and features associated with imperfect optics, all contribute to image contrast, which can mask weak images of single molecules. As described herein, a differential-integral imaging processing algorithm is used to subtract out background features that contribute to image contrast above from each frame of the time sequence images and integrate the differential images to recover the binding and unbinding of single protein molecules on the sensor surface. A drift or motion correction algorithm is introduced to track the drift or motion pattern of one or more features on the sensor surface and correct the drift or motion from each image frame, thereby reducing the impact of drift in position of the sensor surface or the optics or mechanical vibrations of the environment. Binding kinetics are assessed by counting the individual target molecules on the sensor surface. This digital counting approach allows a precise measurement of binding kinetics. In addition, this approach obviates the need to measure the shift in the surface plasmon resonance angle (determined not only the number of the molecule that bind to the sensor surface, but also by the size of the molecule) either directly or indirectly.

SPR-based single molecule analysis. Implementations include plasmonic imaging systems and methods for SPR-based single molecule analysis. In some cases, the plasmonic imaging system includes an objective. In some cases, the plasmonic imaging system includes an optical prism rather than an objective.

FIG. 1A is a schematic of objective-based plasmonic imaging system 100 that can be used to detect single molecule binding to the surface of a sensor. Surface plasmonic waves ($E_p$) are excited by light from the bottom of a gold-coated glass slide and scattering of the plasmonic waves by a particle or protein ($E_s$) and by the gold surface ($E_b$) is collected from the top to form a plasmonic scattering microscopy (PSM) image. In one example, a sensor includes a metal (e.g., gold) coated glass substrate 102. A solution 104 of the target molecule 106 (e.g. a protein) is introduced to the sensing surface (e.g., via a flow cell). The sensor surface can be functionalized with capture probes 108 for detection of target molecules or particles (e.g., specific proteins). The light scattered from the target molecules or particles is collected from the top camera 110. The conventional surface plasmon resonance image can be obtained from a bottom camera simultaneously.

In some implementations, the objective of the system in FIG. 1A is replaced with an optical prism. The prism has a top surface on which the sensor is placed. The prism also has a flat surface for the introduction of incident light and a second flat surface for light reflected from the sensor surface to exit the prism.

Figure 1B:
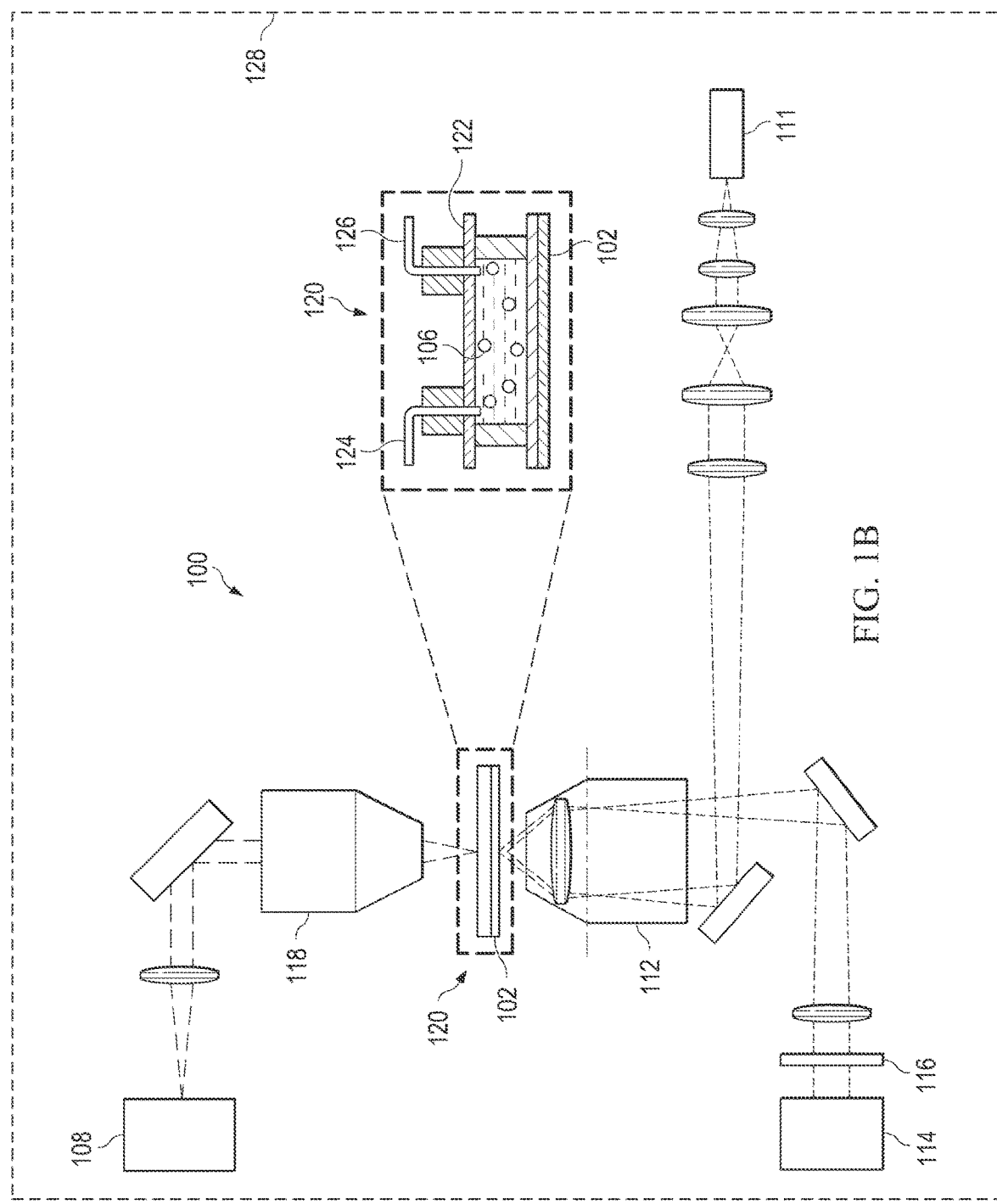

FIG. 1B is a more detailed view of objective-based plasmonic imaging system 100. Optical setup for simultaneous PSM and SPR imaging, where light from a superluminescent diode (SLD) 111 is conditioned and directed via a 60× objective (NA=1.49) 112 onto a gold-coated glass slide 102 mounted on the objective via refractive index matching oil. Light reflected from the gold-coated glass slide 102 is detected by camera 114 (Pike F-032B), which is equipped with an optical attenuator 116 (ND30A, Thorlabs, Newton, NJ) to avoid overexposure. The incident light angle is adjusted to surface plasmon resonance, at which the reflected light reaches a minimum. Simultaneously, light scattered from the gold surface is collected by a 50× objective (NA=0.42) 118 and detected by camera 108 (MQ003MG-CM, XIMEA) placed on top of the gold surface. The incident light intensity is 3 kW/cm$^2$ or less. Camera 114 measures the traditional SPR and camera 108 records PSM images. Flow cell 120 includes gold-coated glass slide 102, cover glass 122, inlet 124, and outlet 126. In one embodiment, a distance between gold-coated glass slide 102 and cover glass 122 is about 50 microns. However, this distance can be different in other embodiments. System 100 can include controller 128. Controller 128 can be configured to control one or more components of system 100 (e.g., cameras 108, 114, SLD 111), to control fluid flow to and away from system 100, and to process data or images collected one or more components of system 100 (e.g., cameras 108, 114). In some cases, controller 128 can be used to correct for mechanical drift in system 100.

In one example, gold-coated glass slides were prepared by evaporating 2 nm thick chromium on BK-7 glass slides, followed by 47 nm gold. Before loading into the vacuum chamber for chromium and gold evaporation, the BK-7 glass slides were cleaned by acetone and by deionized water thoroughly. The gold surfaces were examined by Atomic Force Microscopy (AFM), showing islands of variable sizes.

TIF-based single molecule analysis. Systems for TIF-based molecule analysis can be similar to those for SPR-based single molecule analysis, with a sensor surface that is free of a metallic coating. When the incident angle is near or larger than a critical angle, it is totally reflected from the sensor surface, which has been referred to as total internal reflection (TIF). Under this condition, an evanescent field (also referred to as near field) appears on the sensor surface, which decays exponentially into the solution on top of the sensor surface. As in the SPR implementations, this evanescent field is scattered by single molecules on the sensor surface, and the interference light scattered by the single molecules and by the sensor surface produces image contrast.

Effect of heating due to incident light. To maximize the signal to noise ratio, high incident light intensity is preferred, which, however, causes heating of the sensor surface and leading to instability of the optical system and structure of the target molecules. This problem can be overcome as described herein by using the same fluidics for flowing in and out sample molecules to cool down the heating.

Single proteins are directly imaged with a SPR imaging system, and detected and identified based on their sizes and specific binding to the corresponding antibodies. Quantification of protein binding kinetics is demonstrated by digitally counting and analyzing the binding and unbinding of individual molecules.

The SPR imaging system has several unique features. First, the evanescent field intensity is localized within ~100 nm from the SPR sensor surface (e.g., gold-coated glass slide), making it immune to interference of molecules and impurities in the bulk solution, thus particularly suitable for studying surface binding. Second, there is a large enhancement (20-30 times) in the field near the sensor surface, which is responsible for the high sensitivity of SPR. Finally, the resonance condition of SPR depends on the refractive index near the sensor surface, such that surface charging, small molecules or ions, and biochemical reactions that do not scatter light strongly can also be measured with the same setup from the simultaneously recorded traditional SPR images.

Referring to FIG. 1A, surface plasmonic waves are excited by directing light at an appropriate angle via an oil-immersion objective onto a gold-coated glass slide placed on the objective. In traditional SPR, light reflected from the gold surface is collected to form an SPR image, which is described by $$I \sim |E_p + E_s + E_r|^2, \quad (2)$$

where $E_p$ is the plasmonic wave excited by the incident light, $E_s$ describes the scattering of the plasmonic wave by a protein on the sensor surface, and $E_r$ is the reflection of the incident wave from the backside of the gold surface. The SPR image contrast is determined by the interference between the planar plasmonic wave and the spherical scattered plasmonic wave, given by $2|E_p||E_s|\cos(\theta)$, where $\theta$ is the phase difference between the two waves, which produces a spot at the location of the protein with a parabolic tail. $E_s$ is proportional to the optical polarizability of the protein, which scales with the mass of the protein or $d^3$, where d is the diameter.

$E_r$ in Eq. 2 produces a large background in the SPR image, which masks the weak scattered wave ($E_s$) from a single protein. To overcome this difficulty, plasmonic waves scattered by the protein were imaged with a second objective placed on top of the sample, in addition to recording the traditional SPR images from the bottom. This avoids the collection of the strong reflection and also eliminates the parabolic tail, providing a high contrast image of the protein. At first glance, the image contrast should scale according to $|E_s|^2 \sim d^6$. This would lead to a rapid drop in the image contrast with decreasing d, making it challenging to detect small proteins. However, the gold surface is not atomically flat. Atomic Force Microscopy (AFM) has revealed nm-scaled gold islands, which scatter the surface plasmonic waves and produce a background ($E_b$) also collected by the top objective. Consequently, the plasmonic image is given by $$I \sim |E_b + E_p|^2 = |E_b|^2 + 2|E_b||E_s|\cos(\beta) + |E_s|^2, \quad (3)$$

where $\beta$ is the phase difference between light scattered by the protein and by the gold surface. The interference term, $2|E_b||E_s|\cos(\beta)$, in Eq. 3 produces image contrast that scales with $d^3$, or the mass of the protein. To differentiate this plasmonic imaging method from the traditional SPR imaging, it is referred to as PSM.

To obtain a high contrast PSM image, $|E_b|^2$ is removed from Eq. 3, which is achieved with the following imaging processing flow. Starting from the raw images captured with a high frame rate, the image frames are averaged (e.g., over 50 ms) to remove pixel and other random noise in the images. Differential images are then obtained by subtracting a previous frame from each frame, or I(N)−I(N−1), where I(N) and I(N−1) are the $N^{th}$ and $(N-1)^{th}$ image frames. The subtraction removes background features and captures the binding of a protein to the surface on $N^{th}$ image frame. To view all the proteins on the surface on $N^{th}$ frame, the differential images are integrated from 1 to N. Due to thermal and mechanical drift of the optical system, a drift correction mechanism is introduced to ensure effective removal of the background.

Figure 2:
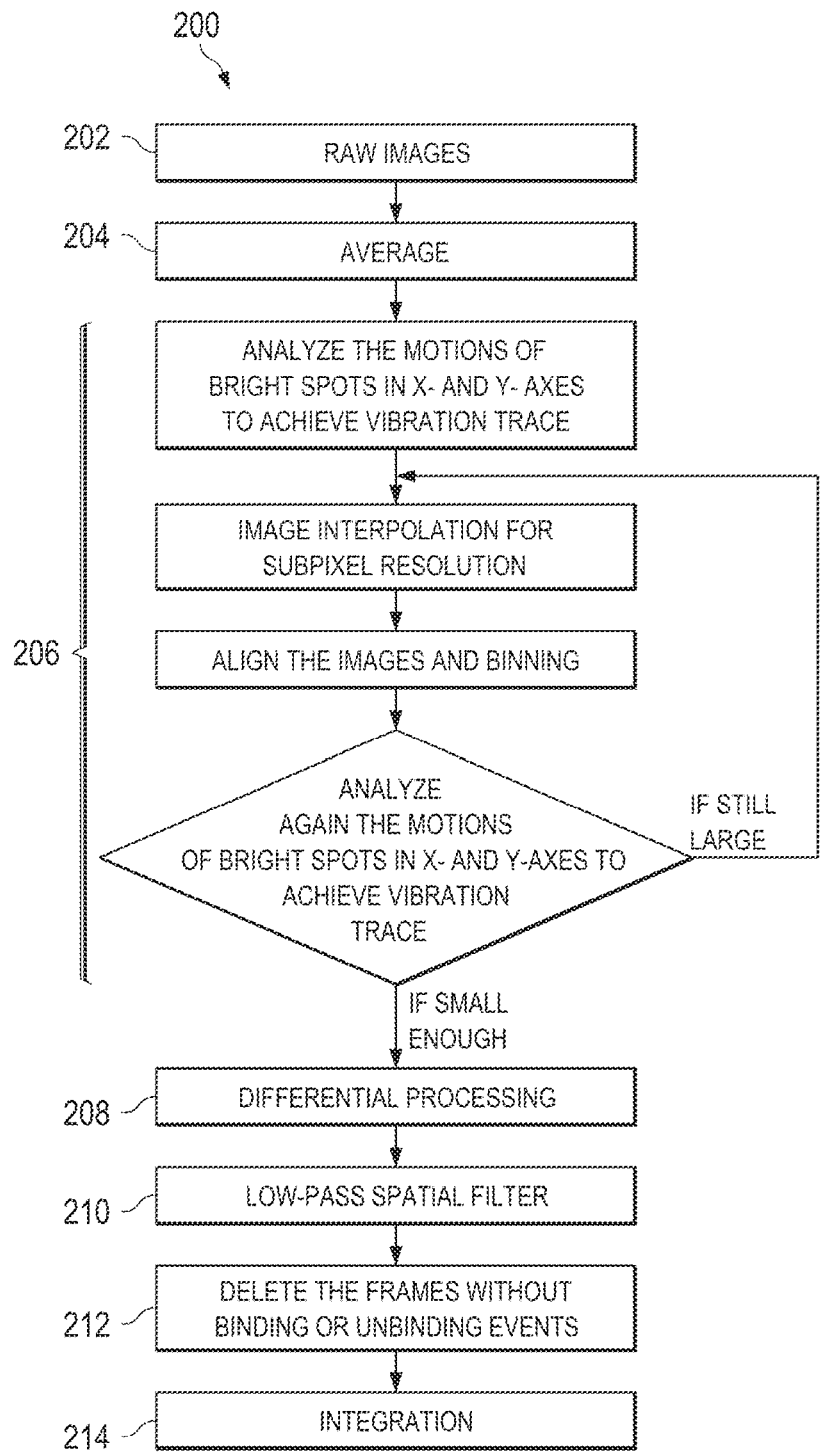
FIG. 2 shows steps in an image processing algorithm.

Referring to FIG. 2, data processing protocol 200 of PSM images includes capturing 202 raw images, averaging 204 the image sequence captured at a high frame rate to remove pixel and other random noise in the images, introducing 206 a drift correction mechanism to correct the thermal and mechanical drift of the optical system, obtaining 208 differential images by subtracting the previous frame from the present frame, applying 210 a low-pass spatial filter to further minimize noise to the differential image sequence, removing 212 image frames without binding or unbinding events from the filtered differential image sequence, and integrating 214 the image sequence from first frame to $N^{th}$ frame to produce an image sequence, I(N).

The evanescent field associated with SPR decays exponentially from the surface (z-direction) into the solution. In other words, the scattering of the evanescent field by a finite size object depends on the distance (z) from the surface, and is given by, $$E_{SP} = E_Q \int_0^D \pi(Dz - z^2) e^{-\frac{z}{l}} dz, \quad (4)$$

where $E_0$ is a constant, z is distance from the gold surface, D is the diameter of the particle, and l is the decay length of the evanescent field, which is approximately 200 nm. Taking this z-distance dependence into account, the effective diameters of the 26, 44, 65, 99, 145, and 194 nm polystyrene nanoparticles used in this work should be 25.4, 42.4, 61.6, 91.3, 129.1, and 166.3 nm, respectively. The need of this correction decreases with the size and the correction becomes insignificant for proteins.

Scattering intensity. For wavelength of 670 nm and objective numerical aperture of 0.42, the Airy disk diameter is estimated to be 0.67/0.42~1.60 µm, corresponding to ~10 pixels in the image. PSM intensity of a particle or molecule was determined by integrating the intensity of each pixel within the Airy disk.

IgA binding measurement with conventional SPR. 20 nM IgA solution was injected into the flow cell of BI SPRm 200 instrument with anti-IgA modified surface to test the binding kinetics. The relative SPR intensity is proportional to the shift in the SPR angle, which is determined by the size and number of the IgA molecules on the gold surface and also the refractive index near the surface. By fitting the SPR data with a first order kinetics, the association ($k_{on}$) and dissociation ($k_{off}$) rate constants were found to be $1.5 \times 10^5$ M$^{-1}$ s$^{-1}$ and $7.5 \times 10^{-5}$ s$^{-1}$, respectively. From $k_{on}$ and $k_{off}$, the equilibrium constant ($K_D = k_{off}/k_{on}$) is determined to be ~500 pM.

PSM was validated by imaging polystyrene nanoparticles with diameters varying from 26 nm to 194 nm. For each diameter, the nanoparticles dissolved in PBS buffer were introduced into a solution well mounted on the gold surface, and the binding of the nanoparticles to the surface was recorded over time. The individual nanoparticles appear as bright spots. The image intensity histogram of the individual nanoparticles follows a Gaussian distribution. There is a small second peak, which may be attributed to the formation of dimers. Increasing the nanoparticle size, PSM image contrast increases, as shown by intensity histograms.

Plotting the mean image intensity vs. nanoparticle diameter in logarithmic scale reveals two regimes, corresponding to large and small nanoparticles. In the large nanoparticle regime (diameters>99 nm), the image contrast follows a power law of $d^{5.6}$, where the exponent is close to 6. This is expected because light from the nanoparticles dominates, such that measured image contrast scales with $|E_s|^2$ according to Eq. 3. However, in the small nanoparticle regime (<65 nm), the image contrast scales with $d^3$, which is also expected because the interference term, $2|E_b||E_s|\cos(\beta)$, in Eq. 3 dominates. Proteins are typically smaller than 30 nm, so the cubic power law of $d^3$ provides a good description of the PSM image contrast for proteins.

The capability of PSM for imaging single proteins was demonstrated with human immunoglobulin M (IgM) and human immunoglobulin A (IgA). The images were also compared with those of 26 nm polystyrene nanoparticles. The study was carried out by flowing each protein solution over the sensor surface while recording the binding of individual protein molecules on the surface. In a representative image of IgM, each bright spot is a single IgM molecule. The individual protein binding events were tracked and counter over 5 mins, and an image intensity histogram was constructed from the multiple protein molecules. By fitting the histogram with a Gaussian distribution, the mean intensity of each protein was extracted, from which the diameter of the protein was determined using a calibration curve. The diameter of IgM was found to be 21.9±2.2 nm, which is comparable to 23.7±5.6 nm, the hydrodynamic diameter measured by dynamic light scattering (DLS). For IgA, a smaller protein (385 kDa), the diameter was found to be 15.5±2.1 nm, also consistent with the diameter by DLS (14.6±5.1 nm). The good agreement in protein size between PSM and DLS confirms that the bright spots in the PSM are single protein molecules. The image contrasts of IgM and IgA were compared with that of 26 nm polystyrene nanoparticles, which all fall on the same calibration curve, further supporting the imaging of single proteins with PSM.

To identify single proteins with PSM, the sensor surface was coated with anti-IgA and the specific binding of IgA to anti-IgA was observed. Upon exposure to IgA, the binding of single IgA molecules to anti-IgA took place immediately, which was observed as the bright spots appearing one at a time on the surface. The number of the bright spots were counted and a histogram showed a major peak due to single IgA molecules. As a control experiment, IgM was flown over the anti-IgA coated sensor surface. Unlike the case of IgA, where a bright spot appears and stays on the surface, bright spots (IgM molecules) show up on the surface only transiently, which is expected because IgM does not bind specifically to anti-IgA.

As an additional example for PSM identification of proteins using antibodies, the binding of anti-calmodulin (anti-CaM, MW=150 kDa) to calmodulin (CaM) coated surface was measured using a procedure similar to the binding of IgA to anti-IgA. An image intensity histogram was constructed from the PSM images of IgG and obtained the mean intensity by fitting the histogram with a Gaussian function, from which the diameter of IgG was found to be 12.9±2.5 nm. This value agrees with the hydrodynamic diameter measured by DLS (12.0±2.0 nm). A control experiment was conducted by introducing IgA to the CaM coated surface. Binding of IgA to CaM was not observed, which confirms the specific binding of anti-CaM to CaM.

A powerful application of SPR is to quantify molecular binding kinetics. Here it is shown that PSM can measure binding kinetics at the single-molecule level by counting the binding and unbinding of single molecules. As a demonstration, IgA binding to anti-IgA was studied. First IgA of different concentrations was flown over an anti-IgA coated sensor surface to study the binding process, then PBS buffer was flown over the sensor surface to allow study of unbinding of IgA from anti-IgA. The binding and unbinding processes were tracked by counting the individual IgA molecules in real-time. Plotting the number of bound IgA vs. time produces binding kinetics curves. Fitting of the curves with the first order binding kinetics model determines the association ($k_{on}$) and dissociation ($k_{off}$) rate constants, which are $2.3 \times 10^5$ $M^{-1}$ $s^{-1}$ and $1.6 \times 10^{-4}$ $s^{-1}$, respectively. From $k_{on}$ and $k_{off}$, the equilibrium dissociation constant ($K_D = k_{off}/k_{on}$) is determined to be 696 pM. These values are in good agreement with the results obtained with the traditional SPR. The mean intensity changes associated with the binding and unbinding of events are consistent with the size of an IgA molecule, confirming the detection of single molecules. A control experiment was performed by introducing 5 nM IgM to the anti-IgA coated surface, and no obvious binding was observed.

Compared to the traditional SPR measurement of kinetics, the present single molecule counting method has several distinct advantages. First, PSM measures molecular binding directly, rather than a shift in the SPR resonant angle measured by the traditional SPR, which depends on the refractive index of the solution and must be corrected for accurate binding kinetics measurement. Second, the present method is based on digital counting, rather than an analog signal (e.g., resonant angle), making it immune to thermal or mechanical drift, a common issue in the traditional SPR. Third, the present PSM determines the number and size of molecules independently. In contrast, the resonant angle measured by the traditional SPR depends on both quantities, making it difficult to determine them independently. This capability can quantify protein expression level and differentiate binding of impurity molecules in the sample from that of the target protein base on the size difference. Finally, the single molecule imaging capability allows monitoring of heterogeneity of proteins, due to different conformation, orientation and location on the sensor surface. Three different behaviors of binding of individual IgA molecules can be considered, including when an IgA molecule 1) hits and stays on the surface, 2) hits the surface and stays for several seconds, then leaves the surface, and 3) binds and unbinds rapidly. Analyzing the residence times for different proteins reveals a large variability, which indicates heterogeneity of the proteins.

The image contrast of PSM arises from the interference of light scattered from an object and a reference. Both SPR and PSM detect scattering of surface plasmonic waves, which are localized near the sensor surface with 20-30× intensity enhancement. The fundamental detection limit of these label-free imaging methods is due to shot noise originated from the finite number of photons captured by the camera. In the present PSM setup, that the noise was dominated by shot noise. For an integration time of 50 ms, the shot noise limits the signal-to-noise ratio (S/N) of PSM to ~11 for IgA and ~3 for a 10 nm diameter protein (incident light intensity of 2 kW/cm$^2$). One way to improve S/N is to increase the incident light intensity. With the large plasmonic enhancement, one can achieve the same S/N with either lower incident light or wider field of view compared with non-plasmonic methods. The described setup can perform PSM and SPR measurements simultaneously, thus allowing to retain the capabilities of the traditional SPR, including surface charging, small molecules or ions, and biochemical reactions.

SPR imaging of single proteins was demonstrated by measuring scattering of plasmonic waves. For large particles (>100 nm), the image contrast scales with sixth power of the particle diameter, which is expected for light scattering from isolated particles. However, decreasing the particle size, it transitions to a cubic power dependence of the diameter, due to the interference of light scattered by the particle and by the sensor surface. In addition, it was shown that single proteins can be imaged and identified based on their specific binding to the corresponding antibodies on the sensor surface. Finally, it was shown that PSM allows quantification of single protein binding kinetics by digital counting of the individual binding events. Compared to the traditional SPR, the present method provides the protein size and number information in addition to digital counting-based binding kinetic analysis.

Materials. Polystyrene nanoparticles were purchased from Bangs Laboratories. Phosphate-buffered saline (PBS) was purchased from Corning and filtered with 0.22 μm filters (Millex). Human plasma IgM and human colostrum IgA were purchased from Athens Research and Technology. Anti-calmodulin (IgG) was purchased from Invitrogen. Calmodulin and bovine serum albumin (BSA) were purchased from Sigma-Aldrich. N-ethyl-N'-(dimethylaminopropyl) carbodiimide (EDC) and N-hydroxysulfosuccinimide (Sulfo-NHS) were purchased from Thermo Fisher Scientific. Dithiolalkanearomatic PEG6-COOH was purchased from Sensopath Technologies. Other chemicals were from Sigma-Aldrich. DI water with resistivity of 18.2 MΩ/cm was filtrated with 0.22 μm filter and used in all experiments.

Experimental setup. A 25 mW superluminescent light emitting diode (SLED) (SLD-260-UHP, Superlum) with central wavelength at 670 nm is used as a light source. Light from the SLED is conditioned by a lens group, and then focused to the back focal plane of a 60× objective (NA=1.49) by a tube lens with focal length of 400 mm. The incident angle was adjusted by a manual translation stage to reach surface plasmon resonance (Thorlabs, Newton, NJ). Light reflected from the gold-coated glass slide is also collected by a camera (Pike F-032B) for helping to find the resonance angle. Scattered light from the protein and gold surface is collected by a 50× objective (NA=0.42) to form a PSM image by a second camera (MQ003MG-CM, XIMEA). The incident light intensity and camera exposure time were optimized for each measurement.

Surface functionalization. Gold coated glass slides were fabricated by coating a BK7 glass cover slides with 1 nm Cr followed by 47 nm gold via thermal evaporation. Prior to coating, the gold surface was rinsed by ethanol and deionized water twice, and then annealed with hydrogen flame to remove surface contaminants. The gold surface of each glass slide was modified with carboxyl groups by incubation with 1 mM dithiolalkanearomatic PEG6-COOH for 1 hour. Then the surface was incubated in 0.05 M NHS/0.2 M EDC for 30 min to activate the carboxyl groups. After rinsing with PBS, 20 nM anti-IgA or calmodulin was applied to the surface and incubated for 30 min to allow immobilization. At last, the surface was incubated in 1 mg/ml BSA for 10 min to block non-specific binding sites.

Shot noise estimation and incident light intensity. The mean PSM image intensity of an IgA molecule is ~2287 photons, and the corresponding signal-to-noise ratio (S/N) is ~12, which is close to the measured S/N of 11. This indicates that shot noise determines the smallest detectable protein size, and the S/N can be improved by increasing the incident light intensity and scattered light collection efficiency.

To optimize the image contrast while minimizing possible heating effect, adjusted the incident light intensity was adjusted for different sizes of particles. Low incident light was typically used to image large particles and high intensity light for small particles.

Prism Based Plasmonic Scattering Imaging

Figure 3A:
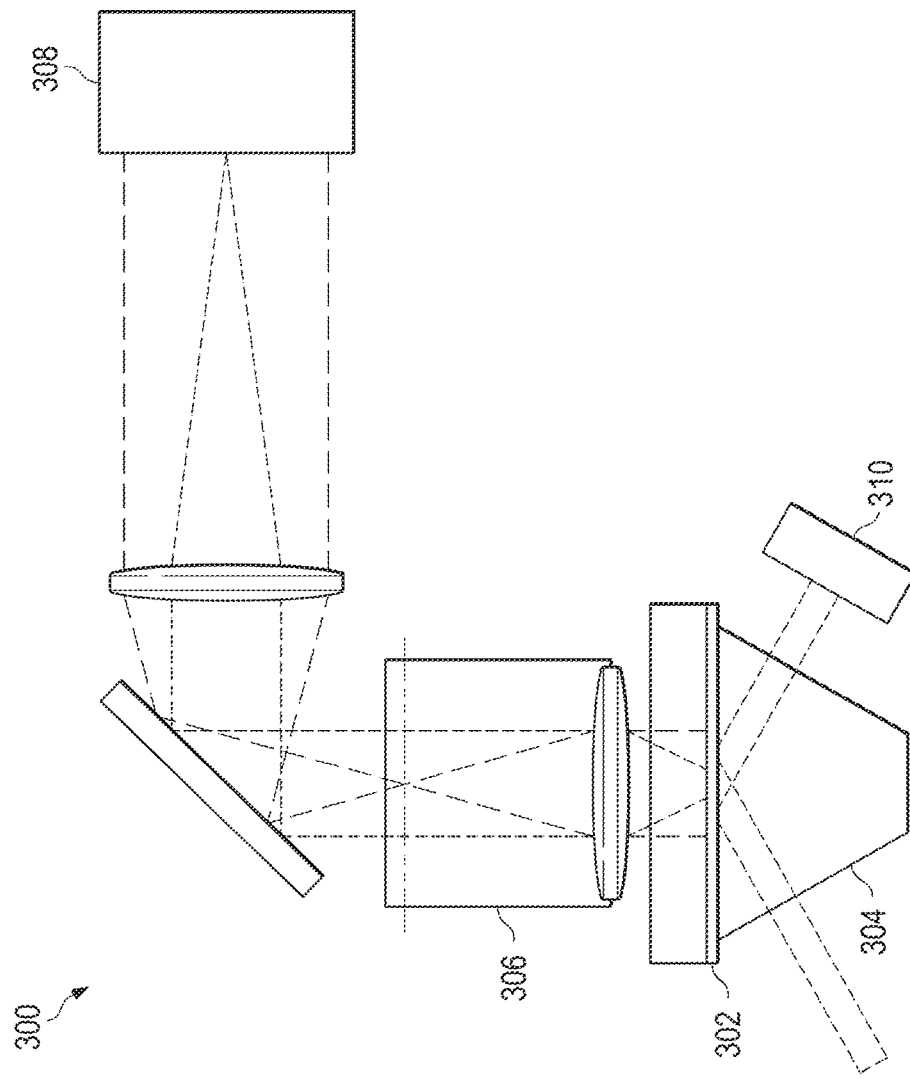
FIGS. 3A and 3B depict a prism-coupled plasmonic scattering microscopy system.
Figure 3B:
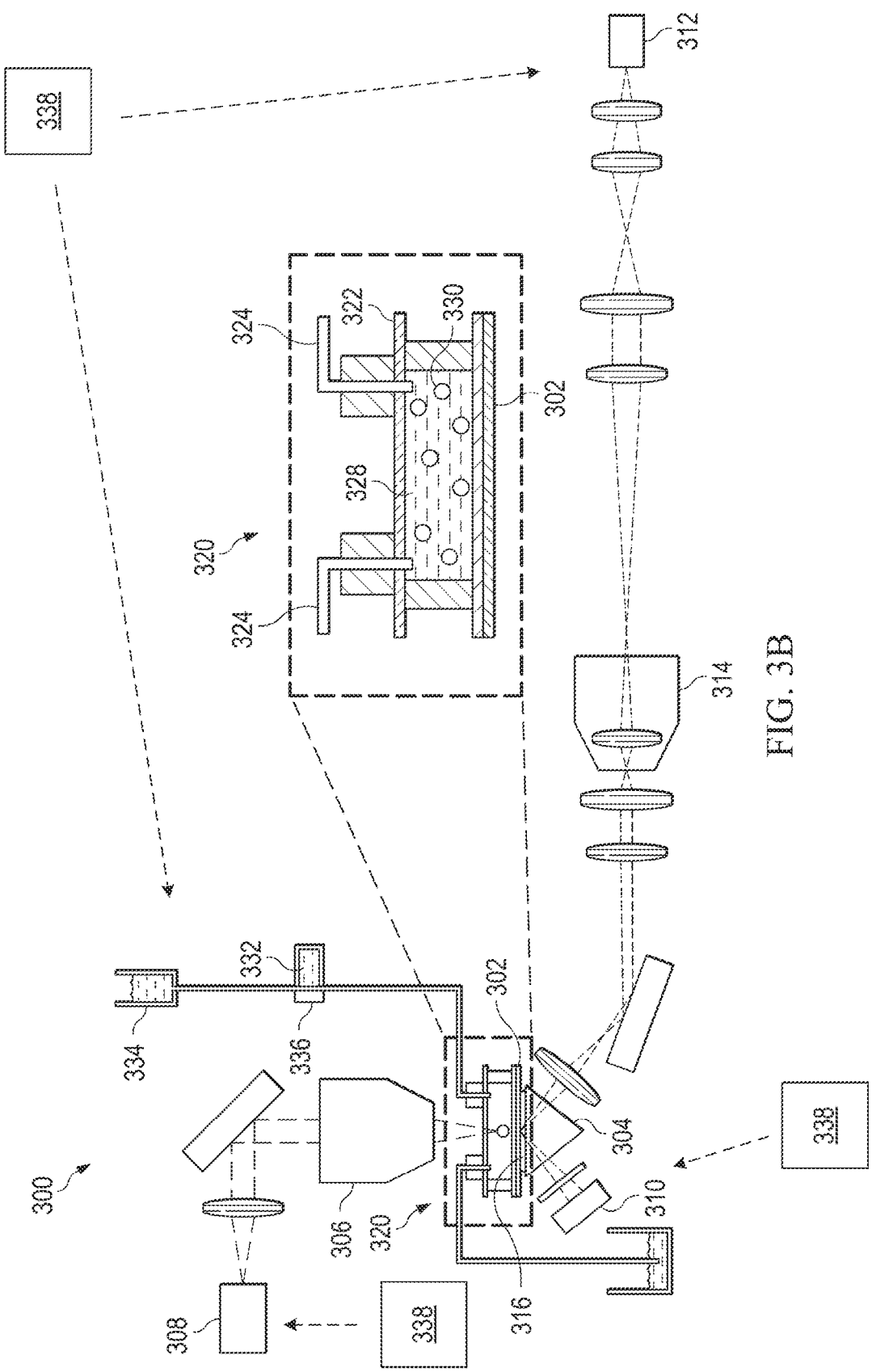

Surface plasmonic waves are excited with a typical Kretschmann prism configuration 300 as shown in FIGS. 3A and 3B. As depicted in FIG. 3A, surface plasmonic waves are excited by p-polarized light from the bottom of gold-coated glass slide 302 coupled to prism 304. Plasmonic waves are scattered by a particle or protein ($E_s$) and by the gold surface ($E_b$) is collected from the top to form a PSM image. Objective 306 and camera 308 are placed on top of the sample, and the ensemble SPR signals are recorded from the bottom via camera 310. PSM does not measure the reflection light, thus allowing incident light intensity up to 5 kW/cm² for imaging single unlabeled proteins. The PSM image is given by $|E_b+E_s|^2=|E_b|^2+2|E_b||E_s|\cos(\theta)+|E_s|^2$ where $E_b$ and $E_s$ are light scattered by surface roughness and analyte, respectively, and $\theta$ is the phase difference. For a thermally vacuum-evaporated gold film, PSM image intensity usually scales according to $|E_s|^2 \sim d^6$ for analytes with diameter larger than 100 nm, and $2|E_b||E_s|\cos(\theta) \sim d^3$ for analytes with smaller diameter due to the condition of $|E_b|^2 >> |E_s|^2$, where d is the analyte diameter. Protein molecules are typically smaller than 30 nm in diameter, so the cubic power law can be considered as a good description of the PSM image intensity for single proteins.

FIG. 3B shows a more detailed view of system 300. Light provided by laser 312 travels though objective 314 to prism 304, through immersion oil 316 to flow cell 320. Flow cell 320 include gold-coated glass slide 302, cover glass 322, inlet 324, and outlet 326. Fluid 328 with nanoparticle or molecules 330 flows through flow cell 320. Scattered light passes through objective 306 and to camera 308. Sample 332 including nanoparticles or molecules 330 can be combined with buffer 334 and injected to flow cell 320 through injection valve 336.

The prism based SPR imaging system 300 does not need to maintain distance between the gold-coated glass slide 302 and the prism 304, and thus the gold-coated glass slide can be coupled or fixed to the prism by a thin layer of immersion oil. This mechanically stable structure permits not only shot noise limited measurement with average period up to 50 ms, but also only changing the gold-coated glass slides to perform different experiments without readjusting focus and incident angle. In addition, it eliminates the focusing mechanism for adjusting the slide position and provides sufficient space above the gold-coated glass slide for a high numerical aperture (NA) top objective, which usually has a short working distance. An objective with NA of 0.7 and a working distance of ~2 mm are used. A higher NA improves the light collection efficiency and enhances the signal to noise ratio of the image.

System 300 can include one or more controllers 338. Controllers 338 can be configured to control one or more components of system 300 (e.g., cameras 308, 310, laser 312), to control fluid flow to and away from system 300, and to process data or images collected one or more components of system 300 (e.g., cameras 308, 310). In some cases, controller 338 can be used to correct for mechanical drift in system 300.

After averaging the raw image sequence over 25 ms and removing the $|E_b|^2$ with differential processing, a PSM image shows seven individual 26 nm polystyrene nanoparticles bound to the surface. The PSM image shows higher image contrast than SPRM image for at least two reasons. First, PSM allows higher incident light intensity, which improves the signal to noise ratio. An incident intensity of 2.5 kW/cm$^2$ can be achieved, while typical SPRM employs an incident intensity of ~0.1 W/cm$^2$. Second, planar surface plasmonic waves do not contribute to PSM image contrast, thus eliminating the parabolic tails in PSM image. PSM images show individual 26 nm, 44 nm, 65 nm, 99 nm, 145 nm, and 194 nm polystyrene nanoparticles.

Effect of delocalization feature of surface plasmonic wave. Analytes usually create more complex patterns than Airy distribution in PSM images. Owing to high spatial resolution provided by the high NA top objective, the prism based PSM shows the effect of delocalization of surface plasmonic waves on the image features more clearly than objective based PSM. The patterns are mainly located in the same direction of surface plasmonic wave within a few microns, which is the range of the propagation length of surface plasmonic wave for gold film, as demonstrated as the features of the scattering of surface plasmonic waves. Unlike the SPRM image, where the patterns are strictly distributed as the parabolic tail along the propagation direction of surface plasmonic wave, the patterns at different locations in PSM images reveal that they are roughly distributed along the propagation direction with spatial heterogeneity. However, the analysis between the analyte-induced intensity changes and random $|E_b|^2$ reveals a missing correlation between them. This suggests that the delocalized scattered surface plasmonic waves by high density random nanometer-scale gold film surface roughness may create a comparable homogenous reference field with spatially heterogeneous distribution, which requires further theoretical modeling. Considering that most energy of analyte-induced signal is concentrated within the diffraction limited spots and the surrounding patterns become unobvious for the particles with diameter of 26 nm, which has been larger than most proteins, the PSM image intensity is determined by integrating the intensities of all pixels within the Airy disk for current applications.

Figure 4:
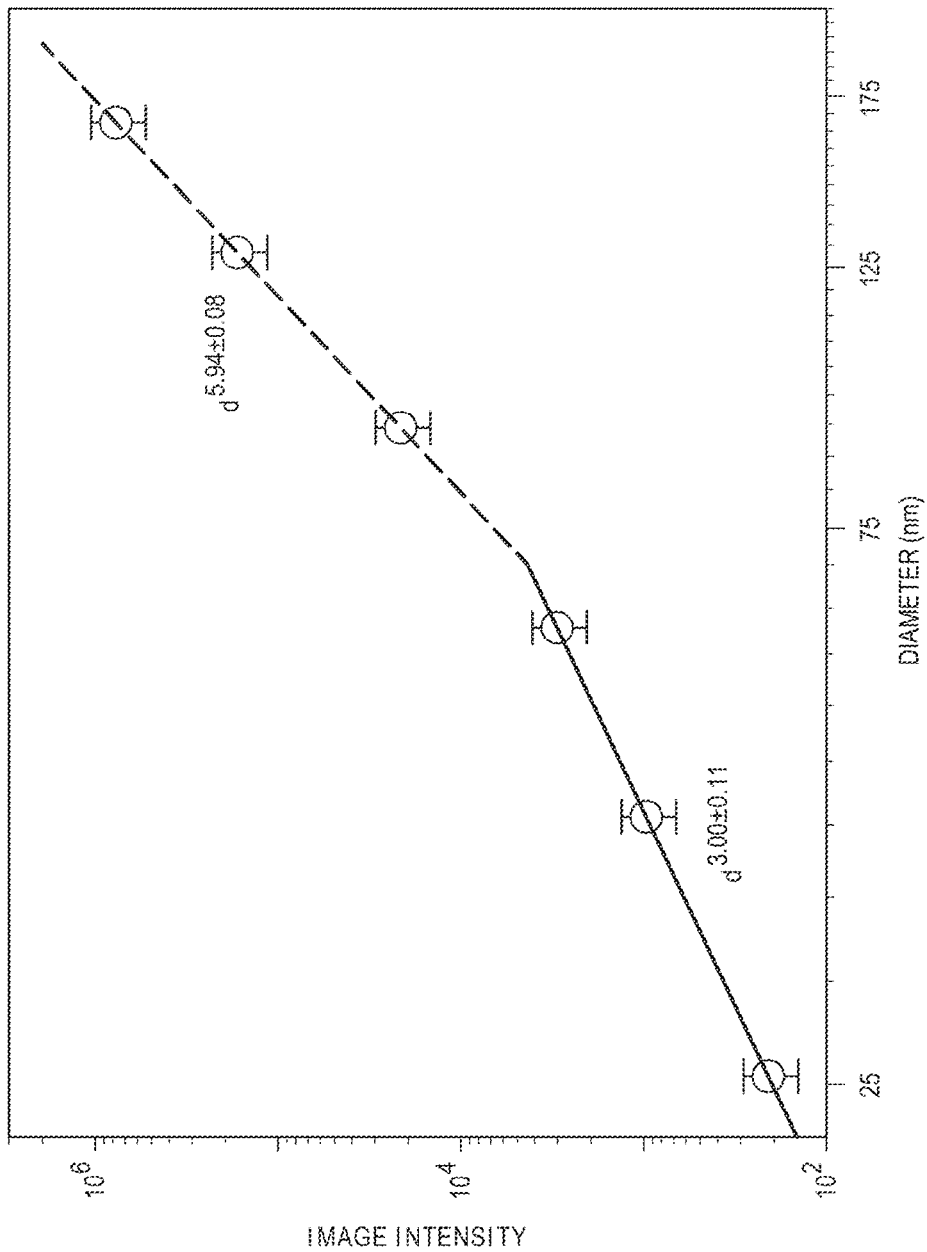
FIG. 4 shows plasmonic scattering microscopy image intensity versus particle diameter.

Calibration with polystyrene nanoparticles. To validate the transition from scattering to interference for PSM image intensity variation against nanoparticle diameter, polystyrene nanoparticles with diameters (d) varying from 26 nm to 194 nm were imaged on a gold-coated glass side. For each size, the nanoparticles dissolved in PBS buffer were flowed over the bare gold surface, and the binding events were recorded over time. The incident intensity was optimized considering both signal to noise ratio and heating effect, and the camera exposure time was optimized for good image contrast while avoiding saturation for each measurement. The cumulative binding events of 26, 44, 65, 99, 145, and 194 nm polystyrene nanoparticles at different locations reveal the individual bound nanoparticles as bright spots. The calibration bar represents the grayscale intensity range prior to the pseudo color processing. After tracking these binding events and calculating their image intensities, the intensity histograms are constructed and fitted with Gaussian distributions. Small secondary peaks in the histograms may be created by the formation of dimers or two particles binding to the nearby surface simultaneously with distance smaller than the diffraction limit. FIG. 4 shows a plot of the mean image intensity vs. nanoparticle diameter in logarithmic scale, where the effective nanoparticle diameter is employed considering that surface plasmonic wave decays exponentially from the surface. The plot reveals two regimes. For large nanoparticles (d>99 nm), the image intensity scales with a ~sixth power, showing that scattering component $|E_s|^2$ in dominates. For small nanoparticles (d<65 nm), the image intensity scales with cubic power, indicating the interference term $2|E_b||E_s|\cos(\theta)$ dominates. For single proteins with the diameter of typically smaller than 30 nm, the cubic power law, namely the molecular mass law, can describe the PSM image intensity well.

Figure 5:
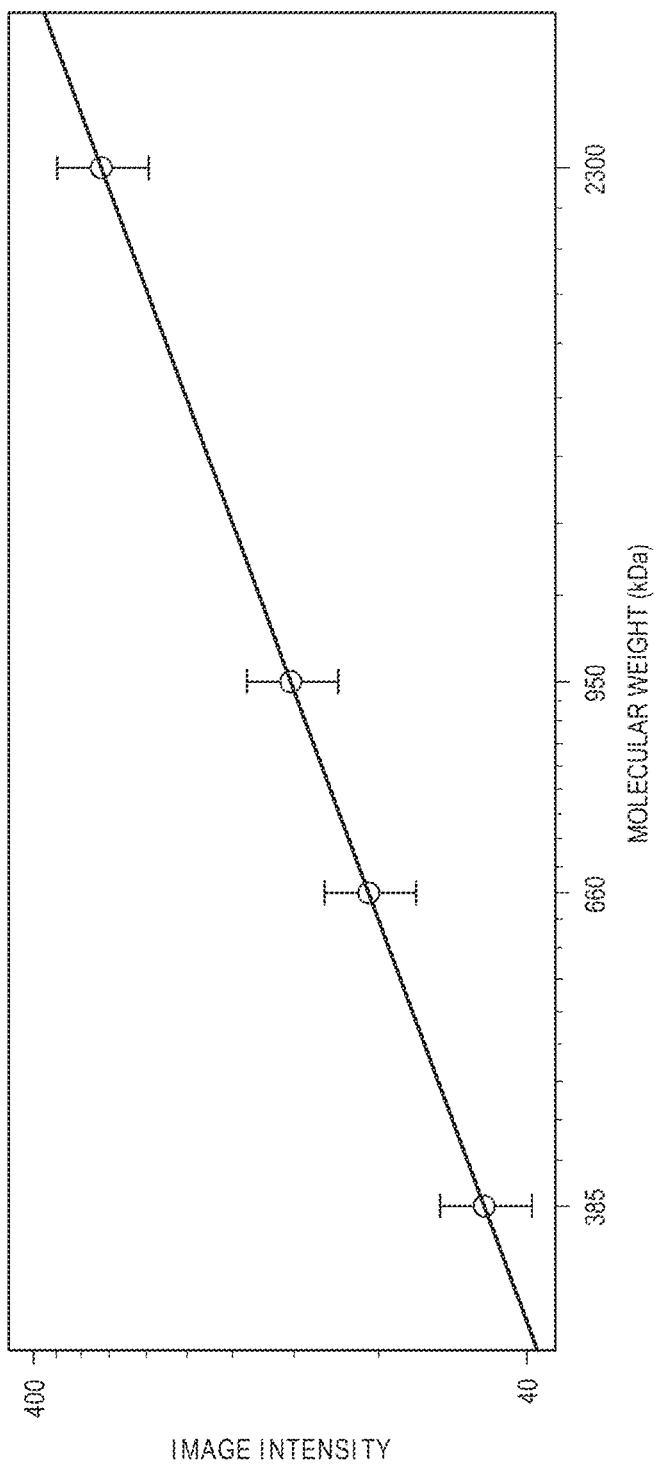
FIG. 5 shows plasmonic scattering microscopy image intensity versus molecular mass.

Detection of single proteins. To obtain the calibration curve of PSM image intensity against protein molecular mass, human immunoglobulin A (IgA), human thyroglobulin (Tg), human immunoglobulin M (IgM), and low density lipoprotein (LDL) with molecular mass of 385, 660, 950, and 2300 kDa were dissolved in PBS buffer and flowed over the bare gold surface. The proteins bound to the surface via non-specific interactions. The binding events for each protein were recorded over time. After tracking cumulative IgA, Tg, IgM, and LDL binding events at different locations and calculating their image intensities, the intensity histograms are constructed. Gaussian distribution was employed to fit these histograms. Small secondary peaks in the histograms may be created by the formation of dimers or two proteins binding to adjacent locations within the diffraction limit simultaneously. Plotting the mean image intensity against molecular mass reveals the linear relationship in FIG. 5, confirming that the PSM image intensity is a measure of protein molecular mass.

Figure 6:
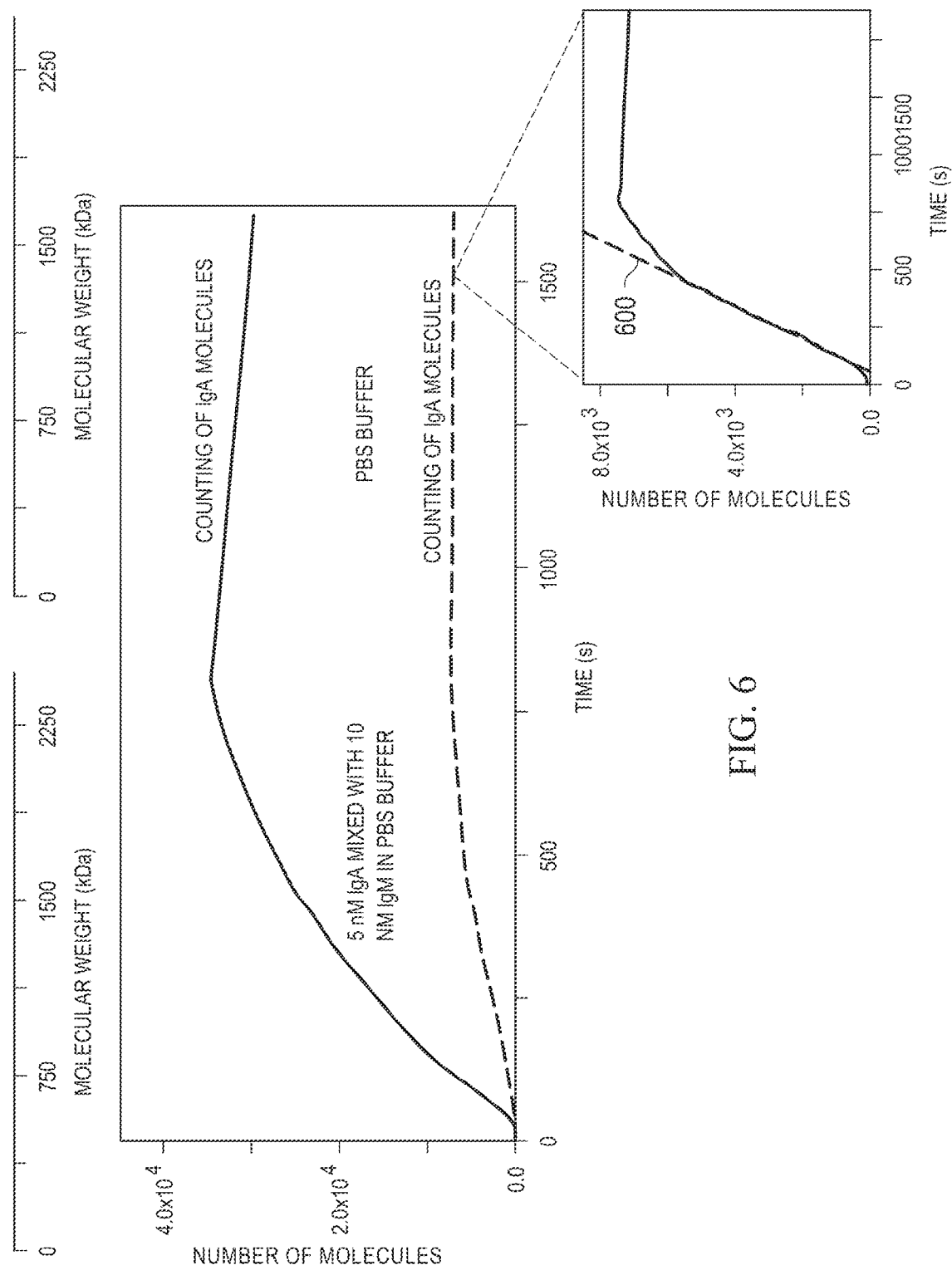
FIG. 6 shows kinetics of IgA binding to anti-IgA and nonspecific binding of IgM to anti-IgA and BSA determined by digitally counting of the binding/unbinding of single molecules.

Differentiating specific and nonspecific binding at the single-molecule level. The specificity of a traditional SPR sensor relies on the target-specific molecular probes and optimized surface chemistry that prevent non-specific interactions, because any molecule binding to the surface will contribute to the signal. In contrary, PSM can differentiate specifically and non-specifically bound molecules at the individual molecule level by analyzing the kinetics of individual binding events and mass discrepancy between target and non-target molecules. To demonstrate this capability, the specific binding of IgM and nonspecific binding of LDL to an anti-IgM antibody coated surface were studied. High antibody coverage of ~10000/μm$^2$ was used throughout all experiments to ensure uniform receptor surface coverage and sufficient capture probability to detect the binding events. Bovine serum albumin (BSA) was employed to block possible nonspecific binding sites. Upon flowing the IgM solution onto the sensor surface, the binding of single IgM molecules to anti-IgM took place immediately, with most proteins retaining on the surface and the number of bound proteins kept increasing over time. In contrast, when LDL solution was flowed over the anti-IgM modified surface, the LDL molecules showed transient binding and unbinding behaviors. This is because IgM molecules have high affinity to anti-IgM on the surface, but LDL molecules have very low affinity to the sensor surface due to surface blocking. The specific binding events of individual IgM proteins were counted, and a molecular mass histogram was constructed, showing a major peak due to single IgM molecules. As additional examples for PSM revealing specific and nonspecific binding processes at single molecule level, the specific binding of IgA and nonspecific binding of Tg to an anti-IgA antibody modified surface were measured, as well as specific binding of anti-BSA antibody (IgG, MW=150 kDa) and nonspecific binding of IgA to a BSA modified surface. They also show the same trend as the anti-IgM/IgM/LDL experiment, where the specific binding can be notably differentiated from non-specific binding. Molecular mass histograms from the specific binding events of IgG and IgA were constructed, also showing major peaks due to single IgA and IgG molecules. For strong non-specific binding events that cannot be identified by single molecule binding behaviors, PSM can also differentiate them using molecular mass as barcode. The PSM result of binding kinetics of 5 nM IgA, which is mixed with 10 nM IgM as impurities, to anti-IgA coated surface can be observed as a molecular mass histogram which shows that the binding events with larger molecular mass notably increase compared with the measurement of purified sample, indicating some IgM molecules bound to surface. After defining the specific and nonspecific binding events based on the molecular mass, the association and dissociation curves are plotted based on digital counting for IgA and IgM binding, respectively. FIG. 6 shows kinetics of IgA binding to anti-IgA and nonspecific binding of IgM to anti-IgA and BSA determined by digitally counting of the binding/unbinding of single molecules. Line 600 in the inset indicates the linear fitting of the nonspecific binding curve. The specific binding curve can be fitted with the first-order binding kinetics model. The association rate ($k_{on}$), dissociation ($k_{off}$) rate constants, and equilibrium dissociation constant ($K_D = k_{off}/k_{on}$) are determined to be $3.9 \times 10^5$ M$^{-1}$ s$^{-1}$, $1.9 \times 10^{-4}$ s$^{-1}$, and 487 pM, respectively. These values agree well with the results obtained with the ensemble SPR. In contrast, the nonspecific binding curve of IgM cannot be fitted with first-order binding kinetics. The association rate of nonspecific binding is initially linear and then slows down, which may be saturating the nonspecific binding sites, while the dissociation curve shows a quick dip followed by very flat decay, indicating that the nonspecific binding includes both weak and strong binding sites.

Figure 7:
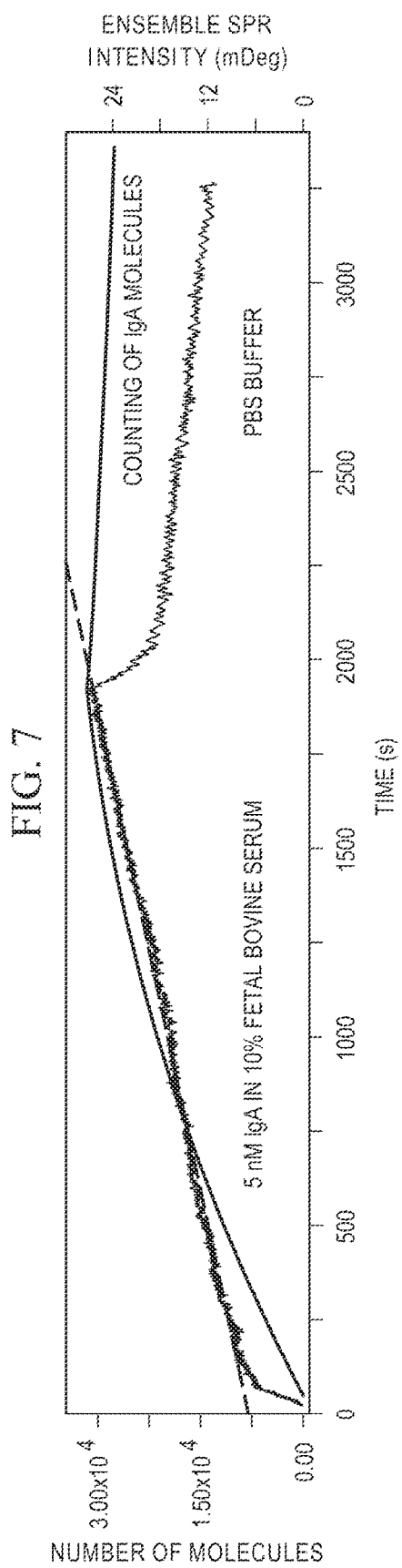
FIG. 7 shows kinetics of IgA binding to anti-IgA determined by digital counting of the binding/unbinding of single IgA molecules, and simultaneously recorded ensemble SPR signals.

Measurement of specific binding of single unlabeled proteins in fetal bovine serum. FIG. 6 shows that PSM can differentiate the specific binding of target proteins from both weak and strong nonspecific binding, making it possible to analyze binding kinetics in complex media. FIG. 7 shows the PSM result of binding kinetics of 5 nM IgA in 10% fetal bovine serum diluted with PBS buffer to anti-IgA coated surface. Considering the weak nonspecific binding events have transient binding and unbinding behaviors, the processed differential frames were further subtracted by following frames to remove the background created by transient nonspecific binding events. Molecular mass histograms show that there are more binding events with larger molecular weight in serum than in pure buffer, which are strong nonspecific bindings that can be differentiated based on the molecular mass. Therefore, after removing these non-specific binding events, the association and dissociation curves for specific bindings are plotted from the digital counting of IgA binding events, and are well fitted with the first-order binding kinetics model, as shown in FIG. 7. The association ($k_{on}$) and dissociation ($k_{off}$) rate constants, and the equilibrium dissociation constant ($K_D = k_{off}/k_{on}$) are determined to be $1.3 \times 10^5$ M$^{-1}$ s$^{-1}$, $9.2 \times 10^{-5}$ s$^{-1}$, and 720 pM, respectively. These values agree with the results obtained with those achieved with PSM, demonstrating that the digital counting of individual single unlabeled proteins with PSM can be applied for the binding kinetic analysis in complex media like serum. In contrary, simultaneously recorded ensemble SPR measurement records the sum signal of specific binding and non-specific binding.

PSM is insensitive to bulk refractive index changes. Another advantage of digital counting based binding kinetic measurement is the tolerance to bulk refractive index changes, which is a noise source for ensemble SPR. The running buffer and sample buffer usually need to be carefully matched in content and concentration for ensemble SPR, to avoid the bulk refractive index change induced response curve shift upon switching between buffer and sample. To demonstrate PSM is insensitive to bulk refractive index change, in the serum experiment described above, pure PBS was used as running buffer, while the sample is prepared in 10% serum. As shown in FIG. 7, switching from buffer to sample or from sample to buffer caused large bulk refractive index changes induced shifts in the ensemble SPR response curve. However, this large bulk refractive index change does not affect the response curve generated from PSM counting, as the bulk refractive index shift effect does not generate any counting events.

Measurement reproducibility. One advantage of prism based SPR devices is system stability and high reproducibility. Prism based PSM also maintains this advantage. To test sample to sample variation, 26 nm polystyrene nanoparticle solution was aliquoted into three identical samples, and these samples were sequentially flowed over the gold surface with an injection valve, recorded the binding events, and calculated the image intensities of the binding events. The image intensity distribution of binding events against binding time reveals that the binding frequency is consistent for all the three measurements. The histograms constructed by image intensities of binding events in three measurements show that the mean image intensities are also consistent for all three measurements. These indicate that the measurement on prism based PSM has little drift effect and maintains high measurement consistency over time.

To show the chip to chip reproducibility, IgA proteins were measured on 4 pieces of gold-coated glass slides, and the intensity histograms are constructed, along with the mean and standard deviation values determined by Gaussian fitting. The PSM image intensity has only ~3% variation among different gold-coated glass slides, which is 4 times smaller than the objective configured PSM. This improvement is mainly because the incident angle can be easily fixed to resonance angle in prism based PSM setup, but harder to maintain the incident angle with the same stability in objective based PSM due to the small sizes of image plane and back focal plane.

The image contrast of PSM results from the interference of surface plasmonic waves, which are localized near the metal film surface with 20-30× intensity enhancement, scattered from an object and a reference, which is analogous to SPRM. However, the mechanism is different between PSM and SPRM. SPRM collects the reflection to detect the interference between planar surface plasmonic wave and scattered surface plasmonic wave by analyte, while PSM detects the interference between surface plasmonic waves scattered by gold surface roughness and analyte. PSM avoids the strong reflection that reduces the camera signal collection efficiency, a common issue for high sensitivity imaging, allowing high contrast imaging of single unlabeled protein detection.

Nanoscopic objects invariably absorb some light, resulting in photodamage to the biological samples at high field intensities. Photodamage is also the ultimate limit when pushing the detection limit of PSM by increasing incident light intensity to suppress shot noise, a common approach to improve the signal noise ratio of single molecule imaging. For field of view of 300 μm$^2$, usually can take the incident intensity up to ~6 kW/cm², and higher intensity will damage the protein molecules within 5 minutes. An alternative approach to improve the detection limit demonstrated in this paper is increasing the collection objective NA, which is almost linearly related to signal to noise ratio. Owing to this, prism coupled PSM pushes the practical detection limit, which usually requires the signal to noise ratio of ~10, from IgA (385 kDa) in objective coupled PSM down to IgG (150 kDa). With this detection limit, one application for PSM is for quantification of protein aggregations, a common issue in monoclonal antibody therapy, which is becoming increasingly important for treatment of cancer and infectious diseases, such as COVID-19.

Prism coupled PSM can recognize binding events of individual analytes, offering at least two advantages over the ensemble prism coupled SPR system. First, PSM counted the binding events based on digital counting, rather than an analog signal, making it insensitive to thermal or mechanical drift, a common issue in the label free detection. Second, PSM can distinguish the specific and nonspecific binding of individual events via differences in single molecule mass or binding kinetics, which enhances the specificity of measurement and relaxes the requirement of sample purity and experimental conditions. In contrast, ensemble SPR measures changes in reflection intensity or resonance angle, which can be induced by both specific and non-specific binding, as well as solution refractive index changes. This advantage allows use of PSM to analyze the specific binding kinetics in complex media, which allows applications in diagnostic and biomarker discovery in liquid biopsy that requires the use of body fluid with complex background, such as blood and urine.

Prism coupled PSM permits easy fixation of each component for a stable experimental condition, thus providing better chip to chip reproducibility. This makes it unnecessary to normalize the measurement results with standard samples in each experiment, which is typically needed in objective based PSM. In addition, operators only need to change the gold-coated glass slides to perform different experiments on prism coupled PSM without readjusting focus and incident angle, and this will notably lower the requirement of operational skills.

The PSM approach can also help the performance of commercial SPR imaging systems by including a dry objective on the top of sample. In a commercial prism coupled SPR imaging device (SPRm 200, Biosensing Instruments), high contrast imaging of 194 nm polystyrene nanoparticles with a top mounted 10× objective with working distance of 39 mm and NA of 0.23 and high contrast imaging of 145 nm polystyrene nanoparticles with a 40× NA 0.75 objective can be obtained. As a comparison, SPRM constructed based on high cost inverted optical microscopy usually allows stable imaging of ~100 nm gold nanoparticles in protein interaction analysis. It has been pointed out that small gold particles or dielectric nanoparticles create notably lower heating effect than large gold nanoparticles to reduce the damage on biological analytes and have smaller negative effect on the mode of lipid diffusion in cell imaging applications.

Thus, plasmonic imaging of single unlabeled proteins by measuring scattering of plasmonic waves on top of a prism coupled SPR system has been demonstrated. The prism coupled PSM can measure the mass of single unlabeled proteins and identify specific and nonspecific binding at single molecule level. Compared with traditional ensemble SPR, prism coupled PSM provides statistical distribution of individual objects instead of ensemble-averaging signal, thus allowing the binding kinetic analysis in complex media. Compared with objective configured PSM, prism coupled PSM provides simpler operation and better measurement reproducibility.

Materials. Polystyrene nanoparticles were purchased from Bangs Laboratories. Phosphate buffered saline (PBS) was purchased from Corning and filtered with 0.22 µm filters (Millex). Human plasma low density lipoproteins (LDL), human plasma IgM and human colostrum IgA were purchased from Athens Research and Technology. Anti-IgM, human thyroglobulin (Tg), bovine serum albumin (BSA) were purchased from Sigma-Aldrich. Anti-IgA was purchased from Bio-Rad. N-ethyl-N'-(dimethylaminopropyl) carbodiimide (EDC) and Nhydroxysulfosuccinimide (Sulfo-NHS) were purchased from Thermo Fisher Scientific. Dithiolalkanearomatic PEG6-COOH was purchased from Sensopath Technologies. DI water with resistivity of 18.2 MΩ/cm was filtrated with 0.22 µm filter and used in all experiments.

Experimental setup. An 80 mW diode laser (OBIS 660-75FP, Coherent) with central wavelength at 660 nm is used as light source. Light from the laser is conditioned by a pair of lenses with focal length of 19 mm (AC127-019-A, Thorlabs), and then focused to the back focal plane of a 100× objective by a tube lens with focal length of 300 mm (AC508-300-A, Thorlabs). Then the Gaussian beam focused on the working point of the objective was projected to the prism surface with a lens group (two of AC254-030-A and one of AC254-150-A, Thorlabs). The incident angle was adjusted by a manual translation stage (PT3, Thorlabs, Newton, NJ) to reach surface plasmon resonance. Light reflected from the gold-coated glass slide is also collected by a camera (Point Grey CM3-U3-13Y3M-CS) for helping to find the resonance angle. Scattered light from the protein and gold surface is collected by a top mounted 60× objective (NA=0.7) equipped with 300 mm tube lens for a final 100× magnification to form a PSM image on a second camera (MQ013MG-ON, XIMEA).

Surface functionalization. Gold-coated glass slides were fabricated by coating a BK7 cover glass with 1 nm Cr followed by 47 nm gold via thermal evaporation (PVD75 E-beam/Thermal Evaporator, Kurt J. Lesker Company). Prior to coating, the gold surface was rinsed by ethanol and deionized water twice, and then annealed with hydrogen flame to remove surface contaminants. The gold surface of each glass slide was modified with carboxyl groups by incubation with 1 mM dithiolalkanearomatic PEG6-COOH for 1 hour. Then the surface was incubated in 0.05 M NHS/0.2 M EDC for 30 min to activate the carboxyl groups. After rinsing with PBS, 20 nM anti-IgA, anti-IgM, or BSA was applied to the surface and incubated for 30 min to allow immobilization. At last, the surface was incubated in 1 mg/ml BSA for 10 min to block nonspecific binding sites.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of differentiating unlabeled single molecules, the method comprising:
    binding the unlabeled single molecules to a surface of an optically transparent substrate;
    irradiating the surface of the substrate with light having an incident angle selected to achieve total reflection of the light, thereby scattering light from the surface and from the unlabeled single molecules bound to the surface;
    collecting light scattered by the surface and by the unlabeled single molecules bound to the surface to form a series of images; and,
    identifying different sizes of the unlabeled single molecules bound to the surface of the substrate from the series of images using a digital counting approach, thereby differentiating the unlabeled single molecules.

2. The method of claim 1, wherein a roughness of the surface is selected such that the surface produces scattered light for sufficient interference with the light scattered by the single molecules.

3. The method of claim 2, wherein the roughness of the surface is between 1 nm and 100 nm.

4. The method of claim 1, further comprising processing the series of images.

5. The method of claim 4, wherein processing the series of images comprises: averaging images in the series of images;
    subtracting a previous image from each image to form a differential image sequence; and
    integrating the differential image sequence over time.

6. The method of claim 1, further comprising counting a number of single molecules bound to the surface over time and fitting with a binding model to determine kinetic constants and affinity.

7. The method of claim 1, further comprising correcting for mechanical drift.

8. The method of claim 7, wherein correcting for mechanical drift comprises: identifying one or more features of the surface;
    determining a drift displacement for each image; and
    subtracting the drift displacement from each image.

9. The method of claim 1, where the optically transparent substrate is coated with capture molecules, such that the specific binding of a target analyte in a sample solution can be detected and identified.

10. The method of claim 1, wherein the surface is coated with a metallic layer, and the incident angle is selected to create surface plasmon resonance on the metallic layer.

11. The method of claim 10, wherein the metallic layer is gold.

12. The method of claim 1, wherein the optically transparent substrate comprises an optical objective attached to a glass slide with index matching oil.

13. The method of claim 1, wherein the optically transparent substrate comprises an optical prism attached to a glass slide with index matching oil.

14. A system comprising:
    an optically transparent solid substrate;
    a means for flowing a sample solution over a surface of the substrate;
    a light source configured to irradiate the surface with light having an incident angle selected to achieve total reflection of the light; and
    a collection optical system that comprises a camera, wherein the collection optical system is configured to:
    collect light scatted by the surface and by unlabeled target molecules bound to the surface while avoiding collection of light reflected from the surface to form a series of images collected using the camera; and
    identify different sizes of the unlabeled target molecules bound to the surface of the substrate from the series of images using a digital counting approach.

15. The system of claim 14, wherein a roughness of the surface is selected such that the surface produces scattered light for sufficient interference with the light scattered by the unlabeled target molecules.

16. The system of claim 15, wherein the roughness of the surface is between 1 nm and 100 nm.

17. The system of claim 14, wherein the means for flowing a sample solution over the surface of the substrate comprises:
    a fluidic chamber with an inlet and an outlet on the surface of the substrate;
    a means to deliver sample and reference solutions over the surface of the substrate; and
    a means to adjust the sample and reference solution flow velocity to minimize heating of the surface associated with incident light.

18. The system of claim 14, further comprising a controller, wherein the controller is configured to:
    average images in the series of images;
    subtract a previous image from each image to form a differential image sequence; and
    integrate the differential image sequence over time.

19. The system of claim 14, wherein the collection optical system is configured to collect light scatted by the surface and by the target molecules on the surface from the opposite side of the incident and reflected light.

20. The system of claim 14, wherein the collection optical system is configured to collect light scattered by the surface and by the unlabeled target molecules on the surface on the same side of the incident and reflected light, but avoid the collection of the reflected light.

21. The system of claim 14, wherein the surface comprises receptors configured to bind to the unlabeled target molecules, and binding and unbinding of the unlabeled target molecules is detected by counting the unlabeled target molecules over time and fitting with a binding model to determine kinetic constants and affinity.

22. The system of claim 14, further comprising a controller, wherein the controller is configured to correct for mechanical drift.

23. The system of claim 22, wherein correcting for mechanical drift comprises: identifying one or more features of the surface;
 determining a drift displacement for each image; and
 subtracting the drift displacement from each image.

24. The system of claim 14, wherein the solid substrate is coated with capture molecules, such that the specific binding of a target analyte in a sample solution can be detected and identified.

25. The system of claim 14, wherein the surface is coated with a metallic layer, and the incident angle is selected to create surface plasmon resonance on the metallic layer.

26. The system of claim 25, wherein the metallic layer is gold.

27. The system of claim 14, wherein the optically transparent solid substrate comprises an optical objective attached to a glass slide with index matching oil.

28. The system of claim 14, wherein the optically transparent solid substrate comprises an optical prism attached to a glass slide with index matching oil.

29. A method of differentiating a multiplicity of unlabeled components in a liquid sample, the method comprising:
 flowing the liquid sample over a metal-coated surface of an optically transparent substrate, thereby coupling the unlabeled components to the metal-coated surface;
 directing light to the metal-coated surface through an optical prism at an incident angle selected to achieve surface plasmon resonance at the metal-coated surface;
 obtaining, over a length of time, a series of images comprising regions corresponding to light scattered by each unlabeled component coupled to the metal-coated surface; and
 assessing, from the series of images, an intensity of the light scattered by each unlabeled component coupled to the metal-coated surface as a function of time to identify different sizes of the unlabeled components coupled to the metal-coated surface using a digital counting approach, thereby differentiating the multiplicity of the unlabeled components in the liquid sample.

30. The method of claim 29, wherein a peak intensity of the light scattered from each component increases with a mass of the component.

31. The method of claim 29, further comprising assessing, from the series of images, a length of time each component is coupled to the metal-coated surface.

32. The method of claim 31, wherein the length of time each component is coupled to the metal-coated surface is indicative of the mechanism by which the component is coupled to the metal-coated surface.

33. The method of claim 29, wherein the multiplicity of unlabeled components comprise a multiplicity of unlabeled target molecules.

34. The method of claim 33, wherein the metal-coated surface comprises receptors, and each receptor is configured to specifically bind to one of the multiplicity of unlabeled target molecules.

35. The method of claim 34, wherein the multiplicity of unlabeled components comprises a multiplicity of unlabeled non-target molecules.

36. The method of claim 35, wherein the unlabeled non-target molecules do not specifically bind to the receptors.

37. The method of claim 36, further comprising distinguishing the unlabeled target molecules from the unlabeled non-target molecules based on a peak intensity of the light scattered by each component coupled to the metal-coated surface.

38. The method of claim 36, further comprising distinguishing the unlabeled target molecules from the unlabeled non-target molecules based on a length of time each component is coupled to the metal-coated surface.

39. The method of claim 34, further comprising distinguishing unlabeled target molecules bound to the receptors from unlabeled target molecule otherwise coupled to the metal-coated surface based on a length of time each unlabeled target molecule is coupled to the metal-coated surface.

40. The method of claim 34, further comprising assessing a number of unlabeled target molecules that bind to the receptors during a preselected time interval.

41. The method of claim 40, further comprising assessing a number of unlabeled target molecules that unbind from the receptors during the preselected time interval.

42. The method of claim 41, further comprising assessing an order of the binding kinetics between the unlabeled target molecules and the receptors.

43. The method of claim 34, further comprising distinguishing a bound unlabeled target molecule from a bound aggregate of unlabeled target molecules based on a peak intensity of the light scattered by each component coupled to the metal-coated surface.

44. The method of claim 43, further comprising a number of unlabeled target molecules in the aggregate of unlabeled target molecules based on the peak intensity of the light scattered by the aggregate of unlabeled target molecules.

45. The method of claim 33, wherein the unlabeled target molecule is a protein.

46. The method of claim 29, wherein the liquid sample comprises a buffer solution and at least 10 wt % serum.

47. The method of claim 46, wherein flowing the liquid sample over the metal-coated surface comprises combining the liquid sample with a carrier liquid, and the carrier liquid comprises the buffer solution or a different buffer solution.

48. The method of claim 29, wherein the light scattered by each unlabeled component coupled to the metal-coated surface corresponds to interference between surface plasmonic waves scattered by a roughness of the metal-coated surface and the unlabeled component.

49. The method of claim 29, wherein the metal-coated surface is a gold-coated surface, a silver-coated surface, or an aluminum-coated surface.

* * * * *